US011128180B2

(12) United States Patent
Tsai et al.

(10) Patent No.: US 11,128,180 B2
(45) Date of Patent: Sep. 21, 2021

(54) METHOD AND SUPPLYING-END MODULE FOR DETECTING RECEIVING-END MODULE

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 69 days.

(21) Appl. No.: 15/836,904

(22) Filed: Dec. 10, 2017

(65) Prior Publication Data

US 2018/0102677 A1 Apr. 12, 2018

Related U.S. Application Data

(63) Continuation-in-part of application No. 15/231,795, filed on Aug. 9, 2016, now Pat. No. 10,289,142, (Continued)

(30) Foreign Application Priority Data

Feb. 1, 2011 (TW) .................................. 100103836
May 3, 2013 (TW) .................................. 102115983

(Continued)

(51) Int. Cl.
  *H02J 50/80* (2016.01)
  *H02J 50/12* (2016.01)
  (Continued)

(52) U.S. Cl.
  CPC ............. *H02J 50/80* (2016.02); *H02J 7/025* (2013.01); *H02J 50/12* (2016.02); *H02J 50/40* (2016.02);
  (Continued)

(58) Field of Classification Search
  None
  See application file for complete search history.

(56) References Cited

U.S. PATENT DOCUMENTS 3,573,817 A   4/1971 Akers
7,939,963 B2  5/2011 Chang
(Continued)

FOREIGN PATENT DOCUMENTS

CN   1417931 A   5/2003
CN   1476535 A   2/2004
(Continued)

OTHER PUBLICATIONS

Shinichi Fukuda et al., A novel metal detector using the quality factor of the secondary coil for wireless power transfer systems, <2012 IEEE MTT-S International Microwave Workshop Series on Innovative Wireless Power Transmission:Technologies, Systems, and Applications>, p. 241-244, 2012.

(Continued)

*Primary Examiner* — Daniel Kessie
(74) *Attorney, Agent, or Firm* — Winston Hsu

(57) ABSTRACT

A method of detecting a receiving-end module, for a supplying-end module of an induction type power supply system where the supplying-end module includes a supplying-end coil, includes detecting the supplying-end coil to obtain a self-resonant frequency of the supplying-end coil; determining whether the self-resonant frequency is smaller than a basic frequency; obtaining a first output power corresponding to the self-resonant frequency when the self-resonant frequency is determined to be smaller than the basic frequency and the degree of the self-resonant frequency smaller than the basic frequency exceeds a threshold; and sending an (Continued)

activation signal with the first output power, and starting to supply electric power when a data code corresponding to the activation signal is received.

18 Claims, 4 Drawing Sheets

Related U.S. Application Data which is a continuation-in-part of application No. 15/197,796, filed on Jun. 30, 2016, now Pat. No. 10,312,748, and a continuation-in-part of application No. 15/005,014, filed on Jan. 25, 2016, now Pat. No. 10,114,396, said application No. 15/197,796 is a continuation-in-part of application No. 14/876,788, filed on Oct. 6, 2015, now Pat. No. 9,831,687, and a continuation-in-part of application No. 14/822,875, filed on Aug. 10, 2015, now Pat. No. 9,960,639, and a continuation-in-part of application No. 14/731,421, filed on Jun. 5, 2015, now Pat. No. 10,038,338, which is a continuation-in-part of application No. 14/017,321, filed on Sep. 4, 2013, now Pat. No. 9,628,147, and a continuation-in-part of application No. 13/541,090, filed on Jul. 3, 2012, now Pat. No. 9,075,587, said application No. 14/017,321 is a continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072, said application No. 14/017,321 is a continuation-in-part of application No. 13/541,090, filed on Jul. 3, 2012, now Pat. No. 9,075,587, said application No. 14/876,788 is a continuation-in-part of application No. 14/017,321, filed on Sep. 4, 2013, now Pat. No. 9,628,147.

(30) Foreign Application Priority Data

| Jan. 14, 2015 | (TW) | ................................. | 104101227 |
|---|---|---|---|
| Jun. 2, 2015 | (TW) | ................................. | 104117722 |
| Jun. 30, 2015 | (TW) | ................................. | 104121025 |
| Oct. 28, 2015 | (TW) | ................................. | 104135327 |
| Apr. 14, 2016 | (TW) | ................................. | 105111620 |
| May 13, 2016 | (TW) | ................................. | 105114827 |
| Sep. 14, 2017 | (TW) | ................................. | 106131521 |

(51) Int. Cl.
*H02J 50/90* (2016.01)
*H02J 50/40* (2016.01)
*H02J 7/02* (2016.01)
*H02J 7/00* (2006.01)

(52) U.S. Cl.
CPC .......... *H02J 50/90* (2016.02); *H02J 7/00034* (2020.01); *H02J 7/00045* (2020.01)

(56) References Cited

U.S. PATENT DOCUMENTS

| 8,422,420 | B1 | 4/2013 | Gulasekaran |
|---|---|---|---|
| 8,536,981 | B2 | 9/2013 | Seban |
| 8,731,116 | B2 | 5/2014 | Norconk |
| 8,816,537 | B2 | 8/2014 | Ichikawa |
| 9,143,002 | B2 | 9/2015 | Yeo |
| 9,318,897 | B2 | 4/2016 | Brohlin |
| 9,531,444 | B2 | 12/2016 | Bae |
| 9,553,485 | B2 | 1/2017 | Singh |
| 9,995,777 | B2 | 6/2018 | Von Novak, III |
| 10,056,944 | B2 | 8/2018 | Tsai |
| 10,122,220 | B2 | 11/2018 | Sankar |
| 2001/0048541 | A1 | 12/2001 | Ishii |
| 2005/0076102 | A1 | 4/2005 | Chen |
| 2005/0258826 | A1 | 11/2005 | Kano |
| 2007/0153937 | A1 | 7/2007 | Itkin |
| 2008/0106273 | A1 | 5/2008 | Bauer |
| 2008/0303479 | A1 | 12/2008 | Park |
| 2009/0167300 | A1 | 7/2009 | Cech |
| 2009/0278651 | A1 | 11/2009 | Okada |
| 2009/0284227 | A1 | 11/2009 | Mohammadian |
| 2009/0319212 | A1 | 12/2009 | Cech |
| 2010/0098177 | A1 | 4/2010 | Hamaguchi |
| 2010/0213590 | A1 | 8/2010 | Warren |
| 2010/0225173 | A1 | 9/2010 | Aoyama |
| 2010/0237943 | A1 | 9/2010 | Kim |
| 2010/0270867 | A1* | 10/2010 | Abe .......... H02J 7/025 307/104 |
| 2011/0062793 | A1* | 3/2011 | Azancot .......... H02J 50/80 307/116 |
| 2011/0097996 | A1* | 4/2011 | Kalanithi .......... H04B 5/0043 455/41.1 |
| 2011/0241436 | A1 | 10/2011 | Furukawa |
| 2012/0153739 | A1 | 6/2012 | Cooper |
| 2012/0169132 | A1* | 7/2012 | Choudhary .......... H03J 1/0091 307/104 |
| 2012/0188797 | A1 | 7/2012 | Nakanishi |
| 2013/0049484 | A1 | 2/2013 | Weissentern |
| 2013/0057079 | A1* | 3/2013 | Park .......... H02J 7/025 307/104 |
| 2013/0065518 | A1* | 3/2013 | Byun .......... H02J 50/90 455/39 |
| 2013/0082653 | A1* | 4/2013 | Lee .......... H04B 5/0037 320/108 |
| 2013/0106197 | A1* | 5/2013 | Bae .......... H02J 50/50 307/104 |
| 2013/0109305 | A1 | 5/2013 | Savoj |
| 2013/0147279 | A1 | 6/2013 | Muratov |
| 2013/0147281 | A1 | 6/2013 | Kamata |
| 2013/0162054 | A1 | 6/2013 | Komiyama |
| 2013/0169060 | A1 | 7/2013 | Jung |
| 2013/0175937 | A1 | 7/2013 | Nakajo |
| 2013/0234503 | A1 | 9/2013 | Ichikawa |
| 2013/0267213 | A1 | 10/2013 | Hsu |
| 2014/0015329 | A1* | 1/2014 | Widmer .......... H02J 50/12 307/104 |
| 2014/0077616 | A1 | 3/2014 | Baarman |
| 2014/0184152 | A1 | 7/2014 | Van Der Lee |
| 2014/0197783 | A1 | 7/2014 | Kim |
| 2014/0266031 | A1 | 9/2014 | Sasaki |
| 2014/0333153 | A1 | 11/2014 | Tanaka |
| 2014/0339907 | A1 | 11/2014 | Omae |
| 2014/0355314 | A1 | 12/2014 | Ryan |
| 2015/0044966 | A1 | 2/2015 | Shultz |
| 2015/0123602 | A1 | 5/2015 | Patino |
| 2015/0162054 | A1 | 6/2015 | Ishizu |
| 2015/0162785 | A1 | 6/2015 | Lee |
| 2015/0180286 | A1* | 6/2015 | Asanuma .......... H02J 7/025 307/104 |
| 2015/0263531 | A1 | 9/2015 | Kozakai |
| 2015/0285926 | A1 | 10/2015 | Oettinger |
| 2015/0349573 | A1 | 12/2015 | Tschirhart |
| 2015/0372493 | A1 | 12/2015 | Sankar |
| 2015/0372662 | A1 | 12/2015 | Niessen |
| 2016/0064951 | A1 | 3/2016 | Yamamoto |
| 2016/0064952 | A1 | 3/2016 | Matsumoto |
| 2016/0072336 | A1 | 3/2016 | Tamino |
| 2018/0034281 | A1 | 2/2018 | Tsai |
| 2018/0138756 | A1 | 5/2018 | Bae |
| 2018/0241257 | A1 | 8/2018 | Muratov |

FOREIGN PATENT DOCUMENTS

| CN | 101399464 A | 4/2009 |
|---|---|---|
| CN | 101907730 A | 12/2010 |
| CN | 101924399 A | 12/2010 |
| CN | 102054057 A | 5/2011 |
| CN | 102055250 A | 5/2011 |

(56) References Cited

FOREIGN PATENT DOCUMENTS

| | | |
|---|---|---|
| CN | 102157991 A | 8/2011 |
| CN | 102396131 A | 3/2012 |
| CN | 102474133 A | 5/2012 |
| CN | 202404630 U | 8/2012 |
| CN | 102957215 A | 3/2013 |
| CN | 103069689 A | 4/2013 |
| CN | 103457361 A | 12/2013 |
| CN | 103852631 A | 6/2014 |
| CN | 103852665 A | 6/2014 |
| CN | 103855764 A | 6/2014 |
| CN | 103999325 A | 8/2014 |
| CN | 104160300 A | 11/2014 |
| CN | 104253492 A | 12/2014 |
| CN | 204190475 U | 3/2015 |
| CN | 104521151 A | 4/2015 |
| CN | 104685760 A | 6/2015 |
| CN | 105226845 A | 1/2016 |
| CN | 105308829 A | 2/2016 |
| CN | 205105005 U | 3/2016 |
| CN | 106094041 A | 11/2016 |
| CN | 106134037 A | 11/2016 |
| CN | 106560730 A | 4/2017 |
| CN | 106571692 A | 4/2017 |
| CN | 106685029 A | 5/2017 |
| CN | 107615612 A | 1/2018 |
| EP | 2 555 107 A1 | 2/2013 |
| EP | 3 160 008 A1 | 4/2017 |
| JP | 2014171371 A | 9/2014 |
| JP | 2016-75484 A | 5/2016 |
| JP | 6122402 | 4/2017 |
| JP | 2017511117 A | 4/2017 |
| KR | 100650628 B1 | 11/2006 |
| TW | 201513523 A | 4/2015 |
| TW | 201605143 A | 2/2016 |
| TW | I577108 B | 4/2017 |
| TW | I596546 B | 8/2017 |
| TW | I604678 B | 11/2017 |
| WO | 2015154086 A1 | 10/2015 |
| WO | 2016/159788 A1 | 10/2016 |
| WO | 2016/181658 A1 | 11/2016 |

OTHER PUBLICATIONS

Farid Jolani et al., A novel planar wireless power transfer system with strong coupled magnetic resonances, 2014 IEEE International Wireless Symposium (IWS 2014), IEEE, Mar. 24-26, 2014, China, pp. 1-4.

Huang Xueliang et al., Review and Research Progress on Wireless Power Transfer Technology, Transactions of China Electrotechnical Society, vol. 28, No. 10, Oct. 2013, China, pp. 1-11, Oct. 2013.

Ma et al., Analysis of metal foreign object setting on electric vehicle wireless power transfer system, <Advanced Technology of Electrical Engineering and Energy> vol. 36, No. 2, p. 14-20 ,Feb. 28, 2017.

"A Multi-Coil Wireless Charging System with Parasitic Metal Detection", Yang, China Master's Theses Full-text Database, Engineering Technology II, vol. 09, Sep. 15, 2014.

\* cited by examiner

METHOD AND SUPPLYING-END MODULE FOR DETECTING RECEIVING-END MODULE

CROSS REFERENCE TO RELATED APPLICATIONS

This application is a continuation-in-part application of U.S. application Ser. No. 15/231,795, filed on Aug. 9, 2016, which is further a continuation-in-part application of U.S. application Ser. No. 15/005,014, filed on Jan. 25, 2016, and a continuation-in-part application of U.S. application Ser. No. 15/197,796, filed on Jun. 30, 2016. U.S. application Ser. No. 15/197,796 is further a continuation-in-part application of U.S. application Ser. No. 14/822,875, filed on Aug. 10, 2015, a continuation-in-part application of U.S. application Ser. No. 14/731,421, filed on Jun. 5, 2015, and a continuation-in-part application of U.S. application Ser. No. 14/876,788, filed on Oct. 6, 2015, the contents of which are incorporated herein by reference.

U.S. application Ser. No. 14/731,421 is further a continuation-in-part application of U.S. application Ser. No. 14/017,321, filed on Sep. 4, 2013, and a continuation-in-part application of U.S. application Ser. No. 13/541,090, filed on Jul. 3, 2012. U.S. application Ser. No. 14/017,321 is further a continuation-in-part application of U.S. application Ser. No. 13/541,090, filed on Jul. 3, 2012, and a continuation-in-part application of U.S. application Ser. No. 13/212,564, filed on Aug. 18, 2011. U.S. application Ser. No. 13/212,564 is further a continuation-in-part application of U.S. application Ser. No. 13/154,965, filed on Jun. 7, 2011. U.S. application Ser. No. 14/876,788 is further a continuation-in-part application of U.S. application Ser. No. 14/017,321, filed on Sep. 4, 2013.

BACKGROUND OF THE INVENTION

1. Field of the Invention

The present invention relates to a method and supplying-end module for detecting a receiving-end module, and more particularly, to a method of detecting a receiving-end module by detecting the coil distance and a related supplying-end module.

2. Description of the Prior Art

For safety purposes, a power supply device of an induction type power supply system has to ensure that a proper power receiving device is positioned on the sensing area of a supplying-end coil of the power supply device, and that the power receiving device is ready to receive power before the power is supplied. In order to allow the power supply device to confirm the above conditions, a data code should be transmitted for identification purposes. The data code transmission is performed via the following steps: the power supply device drives the supplying-end coil to generate resonance and sends electromagnetic power to the power receiving device in order to transmit power. When the power receiving device receives the power, the power receiving device may change the impedance on the receiving-end coil via the signal modulation technology, and the variations are fed back to vary the amplitude of carriers on the supplying-end coil, in order to transmit the data code.

When the power supply device is on standby, it should periodically detect existence of power receiving devices and thereby recognize whether a power receiving device enters its power supply area. In the prior art, the power supply device periodically sends energies to detect the power receiving device. After there is a power receiving device entering the coil sensing area of the power supply device and receiving the energies delivered by the power supply device, the power receiving device may be activated and respond with data to the power supply device. The power supply device then determines whether the received data is accurate, and accordingly starts to operate if the data is accurate.

However, the above method of the power supply device sending energies to detect the power receiving device requires continuous delivery of energies. If the delivered energies are not received by the coil of the power receiving device, a problem of electromagnetic interference (EMI) may easily occur. When there is no power receiving device entering the sensing area of the power supply device for a long time, the energies delivered continuously may generate excessive power losses. In addition, when a power receiving device approaches the power supply device, the power supply device may not determine the distance with the power receiving device. If the distance between the power receiving device and the power supply device is closer while the energy sent by the power supply device is excessively large, the power receiving device may immediately receive excessive energies and thus be burnt out. If the distance between the power receiving device and the power supply device is farer while the energy sent by the power supply device is not enough, the power receiving device may not be detected effectively. Thus, there is a need for improvement over the prior art.

SUMMARY OF THE INVENTION

It is therefore an objective of the present invention to provide a method of detecting a receiving-end module and a related supplying-end module, which are capable of determining whether a receiving-end module exists and determining the distance between the receiving-end module and the supplying-end coil by detecting the self-resonant frequency of the supplying-end coil, so as to control the supplying-end coil to output appropriate power.

An embodiment of the present invention discloses a method of detecting a receiving-end module, for a supplying-end module of an induction type power supply system. The supplying-end module comprises a supplying-end coil. The method comprises detecting the supplying-end coil to obtain a self-resonant frequency of the supplying-end coil; determining whether the self-resonant frequency is smaller than a basic frequency; obtaining a first output power corresponding to the self-resonant frequency when the self-resonant frequency is determined to be smaller than the basic frequency and the degree of the self-resonant frequency smaller than the basic frequency exceeds a threshold; and sending an activation signal with the first output power, and starting to supply electric power when a data code corresponding to the activation signal is received.

An embodiment of the present invention further discloses a supplying-end module for an induction type power supply system, for detecting a receiving-end module of the induction type power supply system. The supplying-end module comprises a supplying-end coil and a processor. The processor is configured to perform the following steps: detecting the supplying-end coil to obtain a self-resonant frequency of the supplying-end coil; determining whether the self-resonant frequency is smaller than a basic frequency; obtaining a first output power corresponding to the self-resonant frequency when the self-resonant frequency is determined to be smaller than the basic frequency and the degree of the self-resonant frequency smaller than the basic frequency exceeds a threshold; and controlling the supplying-end coil to send an activation signal with the first output power, and controlling the supplying-end coil to start to supply electric power when a data code corresponding to the activation signal is received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
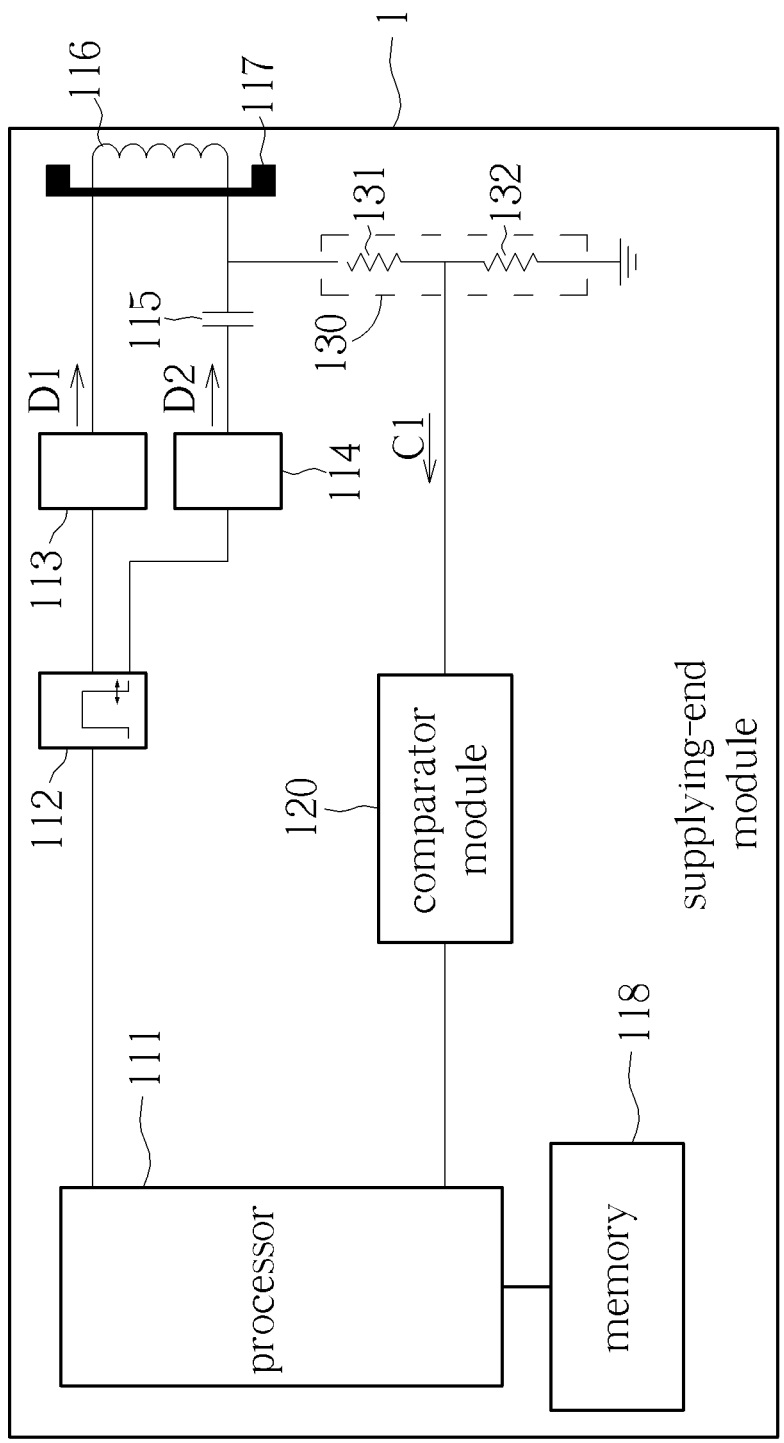
FIG. 1 is a schematic diagram of a supplying-end module according to an embodiment of the present invention.

Please refer to FIG. 1, which is a schematic diagram of a supplying-end module 1 according to an embodiment of the present invention. The supplying-end module 1 is applicable to an induction type power supply system, for sending electric power to a receiving-end module of the induction type power supply system. The supplying-end module 1 includes a supplying-end coil 116 and a resonant capacitor 115. The supplying-end coil 116 may send electromagnetic energies to the receiving-end module in order to supply power. The resonant capacitor 115, coupled to the supplying-end coil 116, may perform resonant together with the supplying-end coil 116. In addition, in the supplying-end module 1, a magnetic conductor 117 composed of magnetic materials may be selectively applied, to enhance the electromagnetic induction capability of the supplying-end coil 116 and also prevent electromagnetic energies from affecting the objects located in the non-inducting side of the coil.

In order to control the operations of the supplying-end coil 116 and the resonant capacitor 115, the supplying-end module 1 further includes a processor 111, a clock generator 112, power driver units 113 and 114, a memory 118, a comparator module 120 and a voltage dividing circuit 130. The power driver units 113 and 114, coupled to the supplying-end coil 116 and the resonant capacitor 115, are used for sending driving signals D1 and D2 to the supplying-end coil 116, respectively. The power driver units 113 and 114 may be controlled by the processor 111, for driving the supplying-end coil 116 to generate and send power. When the power driver units 113 and 114 are both active, full-bridge driving is performed. In some embodiments, only one of the power driver units 113 and 114 is active, or only one of the power driver units 113 or 114 is disposed, which leads to half-bridge driving. The clock generator 112, coupled to the power driver units 113 and 114, is configured for controlling the power driver units 113 and 114 to send the driving signals D1 and D2 or interrupt the driving signals D1 and D2. The clock generator 112 may be a pulse width modulation generator (PWM generator) or any other type of clock generator capable of outputting a clock signal to the power driver units 113 and 114. The processor 111 may receive information related to a coil signal C1 on the supplying-end coil 116 (i.e., the voltage signal between the supplying-end coil 116 and the resonant capacitor 115), and control the output power of the supplying-end coil 116 according to the coil signal C1. In detail, the processor 111 may control the switching frequency of the driving signals D1 and D2 outputted by the power driver units 113 and 114. The switching frequency varies the amplitude of the resonant signal between the supplying-end coil 116 and the resonant capacitor 115. The processor 111 may thereby control the output power of the supplying-end coil 116. The processor 111 may be a central processing unit (CPU), a microprocessor, a micro controller unit (MCU) or any other type of processing device or computing device. The comparator module 120 is configured to track the self-resonant frequency or self-resonant cycle of the coil signal C1, and to provide the information related to the self-resonant frequency or cycle for the processor 111 for follow-up interpretations. The comparator module 120 may include one or more circuit modules each composed of a comparator and a digital to analog converter (DAC). The detailed operations of the comparator module 120 obtaining the self-resonant frequency or cycle of the coil are illustrated in U.S. Publication No. 2016/0349782 A1, and will be omitted herein. The voltage dividing circuit 130 includes voltage dividing resistors 131 and 132, which may attenuate the coil signal C1 on the supplying-end coil 116 and then output the coil signal C1 to the processor 111 and the comparator module 120. In some embodiments, if the tolerance voltage of the circuit elements in the processor 111 and the comparator module 120 is high enough, the voltage dividing circuit 130 may not be applied and the coil signal C1 may be directly received from the supplying-end coil 116. The memory 118 is configured to store the information of the self-resonant frequency/cycle and its corresponding operating frequency and/or output voltage of the supplying-end coil 116. The memory 118 may be realized with any type of memory device, such as a read-only memory (ROM), flash memory or random-access memory (RAM), and is not limited herein. Other possible components or modules such as a power supply unit and display unit may be included or not according to system requirements. These components are omitted herein without affecting the illustrations of the present embodiments.

In general, the self-resonant frequency of the coil is associated with the inductance and capacitance of the coil element. When the inductance or capacitance rises, the self-resonant frequency of the coil falls; and when the inductance or capacitance falls, the self-resonant frequency of the coil rises. In the supplying-end module 1, the capacitance is determined based on the capacitance value of the resonant capacitor 115, and the capacitance value is substantially fixed and has small variations. The inductance is determined based on the inductance value of the supplying-end coil 116, and may vary with peripheral magnetic materials. When the coverage of peripheral magnetic materials on the supplying-end coil 116 increases, the inductance value may increase. When the coverage of peripheral magnetic materials on the supplying-end coil 116 decreases, the inductance value may decrease. Furthermore, there is usually a magnetic material disposed for the receiving-end coil of the induction type power supply system. Therefore, when the receiving-end coil approaches the supplying-end coil 116, what follows is an increasing coverage of magnetic materials on the supplying-end coil 116; hence, the inductance may increase correspondingly, so as to decrease the resonant frequency of the supplying-end coil 116. On the contrary, when the receiving-end coil departs from the supplying-end coil 116, what follows is a decreasing coverage of magnetic materials on the supplying-end coil 116; hence, the inductance may decrease correspondingly, so as to increase the resonant frequency of the supplying-end coil 116. As can be seen, the distance between the receiving-end coil (or the receiving-end module) and the supplying-end coil 116 may completely correspond to the self-resonant frequency of the supplying-end coil 116. If the distance is smaller, the self-resonant frequency may be lower. In such a condition, in the embodiments of the present invention, the self-resonant frequency of the supplying-end coil 116 is detected to determine whether there is a receiving-end module near the supplying-end module, which replaces the conventional method of continuously sending energies by the power supply device to detect the power receiving device. In addition, with detection of the self-resonant frequency of the supplying-end coil 116, the distance between the receiving-end module and the supplying-end module 1 may be accurately determined, so that the supplying-end module 1 may adaptively adjust the output power of the coil.

In order to accurately obtain the self-resonant frequency of the supplying-end coil 116 and the distance between the supplying-end coil 116 and the receiving-end coil, the supplying-end module 1 may enable a learning mode, and detect the self-resonant frequency of the coil under different situations in the learning mode. The processor 111 may obtain the self-resonant frequency of the supplying-end coil 116 when there is no object put in the sensing area of the supplying-end coil 116, where the self-resonant frequency is considered as a basic frequency and stored in the memory 118, as a basis for follow-up comparisons. Subsequently, when the supplying-end module 1 is activated and starts its operations, the supplying-end module 1 may determine that there may be a receiving-end module entering the sensing area of the supplying-end coil 116 if the supplying-end module 1 detects that the self-resonant frequency of the supplying-end coil 116 is smaller than the basic frequency and the degree of the self-resonant frequency smaller than the basic frequency exceeds a threshold.

Figure 2:
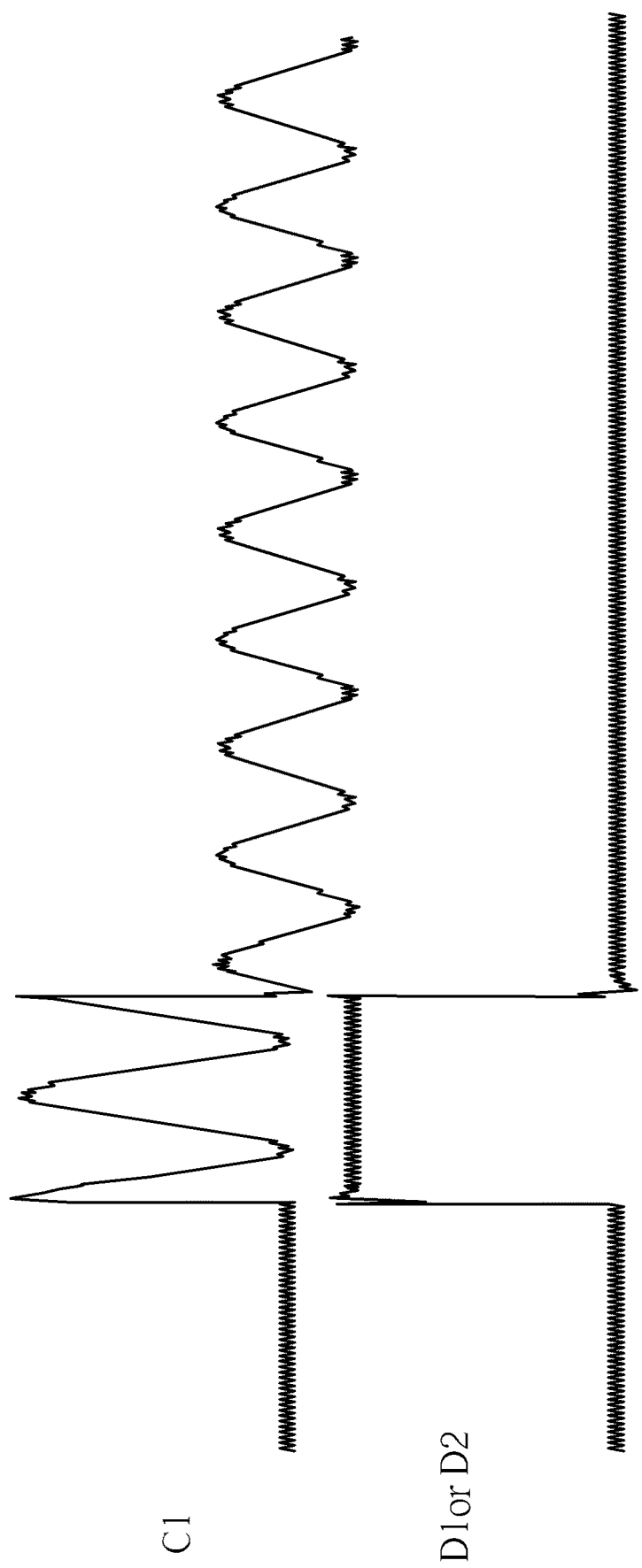
FIG. 2 is a waveform diagram of detection of the self-resonant frequency according to an embodiment of the present invention.

Please refer to FIG. 2, which is a waveform diagram of detection of the self-resonant frequency according to an embodiment of the present invention. FIG. 2 illustrates the waveforms of the coil signal C1 and the driving signal D1 or D2. In detail, when the self-resonant frequency of the supplying-end coil 116 needs to be detected, the power driver unit 113 or 114 may generate a pulse on the driving signal D1 or D2. The coil signal C1 may oscillate due to the pulse signal, and then naturally oscillating with attenuation after the end of the pulse signal. During the process of natural oscillation, the processor 111 may obtain the oscillation frequency of the coil signal C1 via the comparator module 120, and this oscillation frequency is the self-resonant frequency of the supplying-end coil 116. In general, an extremely short pulse of the driving signal D1 or D2 is enough to trigger the coil signal C1 to oscillate. The length of such a pulse may equal several microseconds or several tens of microseconds to the least extent, and the amplitude of natural oscillation of the coil signal C1 is substantially 2-3 volts (V). In comparison, in the prior art, the method of sending energies to activate the receiving-end module is applied to realize detection of power receiving devices. In this case, the energies sent by the supplying-end coil 116 should be large enough to be received by the receiving-end module and to activate the receiving-end module. Therefore, the driving signals D1 and D2 should keep driving the supplying-end coil 116 for a period of time during each cycle, where the length of driving time should allow the supplying-end coil 116 to output enough energy (at least 2-3 milliseconds). Also, the amplitude of the coil signal C1 may be up to 20-30 V. In such a condition, the power loss and electromagnetic interference (EMI) generated by the supplying-end module 1 of the present invention during the process of detecting power receiving devices is far smaller than those generated by the conventional supplying-end module. As a result, the method of detecting power receiving devices realized in the embodiments of the present invention may solve the problem of excessive EMI in the prior art. In addition, the method of detecting the resonant frequency of the coil provided in the present invention may be accomplished within several oscillation cycles (i.e., 2-3 cycles) of the coil signal C1, and thus the detection speed is far faster than the conventional method of sending energies to activate the receiving-end module. The enhancement of detection speed allows the supplying-end module 1 to quickly detect the receiving-end module when the receiving-end module enters its power supply area, which improves the sensitivity of the system.

In addition, in the learning mode, the processor 111 may further obtain the self-resonant frequencies and their corresponding output voltages and/or operating frequencies of the supplying-end coil 116 when the receiving-end module is located in different positions. As mentioned above, when the receiving-end coil is closer to the supplying-end coil 116, the self-resonant frequency becomes lower; hence, different positions may correspond to different values of self-resonant frequency. The supplying-end module 1 may determine the position of the receiving-end coil according to the detected self-resonant frequency, so as to apply an appropriate output voltage or output power to supply electric power. In the learning mode, the processor 111 may obtain the operating frequencies and/or the output voltages when the induction type power supply system has no load or full load, respectively, and thereby obtain the mapping relations of the operating frequencies and/or the output voltages with the self-resonant frequencies.

In detail, in the learning mode, the receiving-end module may be configured to have no load. At this moment, the supplying-end module 1 may request the user or tester to dispose the receiving-end module respectively in multiple positions in the sensing area of the supplying-end coil 116 and then perform testing. When the receiving-end module is located in different positions in the sensing area, the supplying-end module 1 may respectively supply power to the receiving-end module and measure the operating frequency, the no-load output voltage and the self-resonant frequency of the supplying-end coil 116 during power supply. Furthermore, the operating frequency and the no-load output voltage correspond to an optimal operating point of the supplying-end module 1 that supplies power to the receiving-end module having no load. Specifically, the operating frequency is the oscillation frequency of the supplying-end coil 116 and the driving signals D1 and D2 when power is supplied. The no-load output voltage, which corresponds to the amplitude of the sinusoidal wave signal on the supplying-end coil 116, is the output voltage of the supplying-end coil 116 when there is no load. The self-resonant frequency is the frequency of the supplying-end coil 116 that is naturally oscillating during the period of brief interruption of the driving signals D1 and D2. The measured self-resonant frequency may be different when the receiving-end coil is located in different positions, and the self-resonant frequency is related to the distance between the receiving-end coil and the supplying-end coil 116. The detailed operations of briefly interrupting the driving signals D1 and D2 to measure the self-resonant frequency of the supplying-end coil 116 are illustrated in U.S. Publication No. 2016/0349782 A1, and will not be narrated herein.

In addition, in the learning mode, the receiving-end module may be configured to be full-loaded, and corresponding data may be obtained. In detail, during the full-load status, the supplying-end module 1 may request the user or tester to dispose the receiving-end module respectively in multiple positions in the sensing area of the supplying-end coil 116 and then perform testing. When the receiving-end module is located in different positions in the sensing area, the supplying-end module 1 may respectively supply power to the receiving-end module and measure the operating frequency, the full-load output voltage and the self-resonant frequency of the supplying-end coil 116 during power supply. The above measurement results obtained in the learning mode may be stored in the memory 118. In an embodiment, the measurement result may be summarized into a table to be stored, as shown in Table 1:

| Self-resonant frequency | No-load output voltage | Operating frequency (no-load) | Full-load output voltage | Operating frequency (full-load) |
|---|---|---|---|---|
| 100 kHz | 50 V | 130 kHz | 100 V | 110 kHz |
| 110 kHz | 60 V | 140 kHz | 110 V | 120 kHz |
| 120 kHz | 70 V | 150 kHz | 120 V | 130 kHz |
| 130 kHz | 80 V | 160 kHz | 130 V | 140 kHz |
| 140 kHz | 90 V | 170 kHz | 140 V | 150 kHz |
| 150 kHz | 100 V | 180 kHz | 150 V | 160 kHz |

Table 1

As shown in Table 1, in the learning mode, the receiving-end coil is moved to different positions where different self-resonant frequency values may be measured. The self-resonant frequency may be lower if the distance between the receiving-end coil and the supplying-end coil 116 is nearer, and the self-resonant frequency may be higher if the distance between the receiving-end coil and the supplying-end coil 116 is farer. The output voltages and operating frequencies in the no-load status and the output voltages and operating frequencies in the full-load status may respectively be obtained when the receiving-end coil is located in different positions. Subsequently, the supplying-end module 1 may perform detection of receiving-end modules according to the data stored in Table 1 and adjust output power accordingly.

Figure 3:
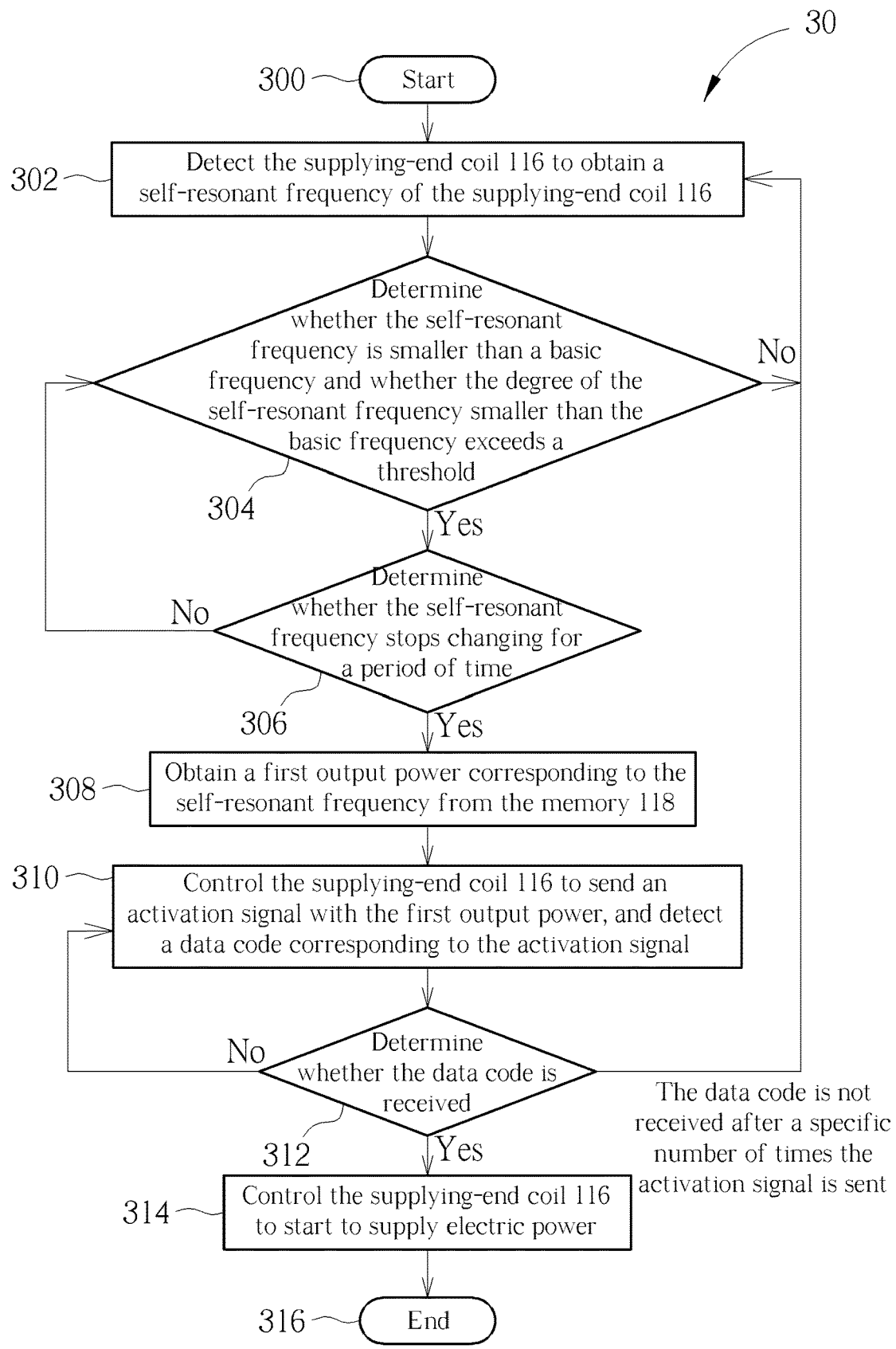
FIG. 3 is a flow chart of a detecting process according to an embodiment of the present invention.

Please refer to FIG. 3, which is a flow chart of a detection process 30 according to an embodiment of the present invention. The detection process 30 may be implemented in the processor of the supplying-end module of the induction type power supply system, such as the processor 111 of the supplying-end module 1 shown in FIG. 1, for detecting whether a power receiving device enters the coil sensing area of the supplying-end module 1. As shown in FIG. 3, the detection process 30 includes the following steps:

Step 300: Start.

Step 302: Detect the supplying-end coil 116 to obtain a self-resonant frequency of the supplying-end coil 116.

Step 304: Determine whether the self-resonant frequency is smaller than a basic frequency and whether the degree of the self-resonant frequency smaller than the basic frequency exceeds a threshold. If yes, go to Step 306; otherwise, go to Step 302.

Step 306: Determine whether the self-resonant frequency stops changing for a period of time. If yes, go to Step 308; otherwise, go to Step 304.

Step 308: Obtain a first output power corresponding to the self-resonant frequency from the memory 118.

Step 310: Control the supplying-end coil 116 to send an activation signal with the first output power, and detect a data code corresponding to the activation signal.

Step 312: Determine whether the data code is received. If yes, the process proceeds to Step 314; otherwise, the flow returns to Step 310; if the corresponding data code is not received after a specific number of times the activation signal is sent, the flow returns to Step 302.

Step 314: Control the supplying-end coil 116 to start to supply electric power.

Step 316: End.

According to the detection process 30, the supplying-end module 1 keeps detecting the self-resonant frequency of the supplying-end coil 116 on standby (Step 302). For example, the processor 111 may control the driving signal D1 or D2 to generate an extremely short pulse to trigger the coil signal C1 to oscillate (as the method shown in FIG. 2); hence, the processor 111 may obtain the oscillation frequency of the coil signal C1 via the comparator module 120, as the self-resonant frequency of the supplying-end coil 116. Subsequently, the processor 111 may determine whether the self-resonant frequency is smaller than the basic frequency and whether the degree of the self-resonant frequency smaller than the basic frequency exceeds a threshold (Step 304). In detail, the basic frequency is obtained in the learning mode and stored in the memory 118, and the processor 111 may retrieve the basic frequency from the memory 118 and compare the basic frequency with the self-resonant frequency measured in Step 302. Take Table 1 as an example for illustration. Supposing that the basic frequency is 170 kHz, and that the sensing area of the supplying-end coil 116 corresponds to the self-resonant frequency ranging from 100 kHz to 150 kHz, the threshold may be configured to 20 kHz (170 kHz minus 150 kHz). In other words, when the processor 111 detects that the self-resonant frequency is smaller than a target value 150 kHz, the processor 111 may determine that there is a receiving-end coil or receiving-end module in the sensing area of the supplying-end coil 116, and performs follow-up determination process.

Subsequently, the processor 111 may determine whether the self-resonant frequency of the supplying-end coil 116 stops changing for a period of time (Step 306). When the processor 111 determines that the self-resonant frequency does not change for a period of time, the receiving-end module may reach and stay at a position. At this moment, the processor 111 may obtain a first output power corresponding to the present self-resonant frequency (Step 308). In the learning mode, the processor 111 has already obtained the no-load output voltages corresponding to the self-resonant frequencies and stored the information in the memory 118 (as shown in Table 1). In Step 308, the processor 111 may retrieve the corresponding no-load output voltage from the memory 118 based on the detected self-resonant frequency, and configure the first output power according to the no-load output voltage. Subsequently, the processor 111 may control the supplying-end coil 116 to send an activation signal with the first output power, and detect a corresponding data code (Step 310). In other words, the processor 111 may determine the distance between the receiving-end module and the supplying-end coil 116 according to the self-resonant frequency, and thereby apply the most appropriate output power to send the activation signal under this distance. The output power applied by the supplying-end module 1 corresponds to the no-load output voltage measured in no-load status, since the load may not be applied yet when the receiving-end module receives the activation signal and performs activation. Afterwards, when the load of the receiving-end module is increased, the receiving-end module then responds with a data code to request the supplying-end module 1 to increase the output power.

Take Table 1 as an example for illustration. If the detected self-resonant frequency is 140 kHz, the supplying-end coil 116 may send the activation signal with 90V output voltage and its corresponding output power. If the detected self-resonant frequency is 100 kHz which means that the receiving-end module is closer to the supplying-end coil 116, the supplying-end coil 116 may send the activation signal with 50V output voltage and its corresponding output power.

In comparison, in the prior art, the supplying-end coil sends energies with a predetermined output power when there is still no power receiving device detected. That is, when a receiving-end coil enters the sensing area of the supplying-end coil, the power supply device may not know the distance with the receiving-end coil immediately. Instead, the power supply device is only able to send energies with the predetermined output power until the data code from the power receiving device is received. The output power may be adjusted based on the information carried in the data code. Therefore, before the supplying-end module receives the data code, the supplying-end module may not apply the most appropriate output power to perform detection of receiving-end modules; hence, the output power may be excessively large to burn out the receiving-end module (when the distance of the receiving-end module from the supplying-end module is too near), or the output power may be excessively small and may not be able to detect the receiving-end module effectively (when the distance of the receiving-end module from the supplying-end module is too far). By using the method of determining the distance between the supplying-end module and the receiving-end module according to the self-resonant frequency provided in the embodiments of the present invention, the above problems may be solved.

In addition, in the process 30, the processor 111 may determine whether the self-resonant frequency of the supplying-end coil 116 stops changing for a period of time, and then perform the follow-up steps of sending the activation signal. In general, when the receiving-end module needs to be charged, the receiving-end module may gradually approach the supplying-end module 1. For example, a user may take a mobile phone out of battery to approach a wireless charger set, or an electric car or auto vehicle may move toward a charging station. The devices should gradually approach the charger module and may not immediately reach the target place. In such a situation, if the processor 111 drives the supplying-end coil 116 to send an activation signal according to the position of the receiving-end module at the moment immediately when detecting the self-resonant frequency falls to a specific value, the supplying-end coil 116 may send the activation signal with an overlarge output power. This is because the moving receiving-end module may be closer to the supplying-end coil 116 at the time when the supplying-end coil 116 sends the activation signal, due to the propagation delay of the signal inside the supplying-end module 1. In order to prevent the above problem, the processor 111 of the present invention may determine the self-resonant frequency stops changing (which means that the receiving-end coil stops moving), and then control the supplying-end coil 116 to send the activation signal with the first output power. The first output power determined in this manner is the most appropriate output power under the position of the receiving-end coil.

After the supplying-end coil 116 of the supplying-end module 1 sends the activation signal, the processor 111 may determine whether a data code is received (Step 312). If the data code is not received, the processor 111 may not be able to acknowledge the existence of the receiving-end module. At this moment, the supplying-end coil 116 may resend the activation signal and the processor 111 keeps performing detection, to determine again whether there is a data code responded by the receiving-end module. If there is still no data code received after the activation signal is sent by multiple times, there may not be any available receiving-end module existing in the coil sensing area of the supplying-end module 1. At this moment, the supplying-end coil 116 may stop sending the activation signal, and the supplying-end module 1 returns to the step of periodically detecting the self-resonant frequency of the coil (such as Step 302). For example, a user may unintentionally put a mobile phone capable of receiving wireless power at a position near a wireless charger set, while the wireless charging function of the mobile phone is not enabled. This mobile phone is equipped with a coil and magnetic material for receiving wireless power. In such a condition, the supplying-end module 1 may detect the mobile phone is approaching based on the variations of the self-resonant frequency, but may not receive an accurate data code. In an embodiment, a maximum number is configured for sending the activation signal. When the number of times the activation signal is sent exceeds the maximum number but the supplying-end module 1 still fails to receive a data code, the supplying-end coil 116 stops sending the activation signal and the supplying-end module 1 returns to the step of periodically detecting the self-resonant frequency of the coil. Until detecting that the self-resonant frequency changes again, the supplying-end module 1 performs follow-up determination steps and accordingly sends another activation signal.

If the processor 111 of the supplying-end module 1 receives the data code and determines that the received data code is accurate, there may be an effective receiving-end module entering the power supply area of the supplying-end module 1 and in position. At this moment, the supplying-end module 1 may start to supply electric power. The processor 111 may supply power by any method. For example, the processor 111 may supply power based on the first output power corresponding to the detected self-resonant frequency. Alternatively, the processor 111 may obtain the power reception status of the power receiving device via the data code, so as to adjust the output power. Afterwards, the processor 111 may further adjust the output power based on load variations.

Please note that the supplying-end module 1 may keep detecting the self-resonant frequency of the supplying-end coil 116 during power supply, and adjust the output power according to variations of the self-resonant frequency. For example, the falling self-resonant frequency means that the receiving-end module approaches to the supplying-end coil 116; hence, the output power should be decreased to prevent the power receiving device from receiving excessive energies. The rising self-resonant frequency means that the receiving-end module departs from the supplying-end coil 116; hence, the output power should be increased to allow the power receiving device to effectively receive the electric power. In addition, during the power supply process, the supplying-end module 1 may keep determining whether the self-resonant frequency of the supplying-end coil 116 is close to or greater than the basic resonant frequency (i.e., basic frequency). The self-resonant frequency determined to be close to or greater than the basic frequency means that the receiving-end module may exit the coil sensing area of the supplying-end module 1. In such a condition, the supplying-end module 1 may stop supplying electric power and return to the step of periodically detecting the self-resonant frequency of the coil.

In detail, the supplying-end module 1 may temporarily interrupt the driving signals D1 and D2 when power is supplied allowing the supplying-end coil 116 to naturally oscillate, so that the self-resonant frequency may be detected. The related operations are similar to the above-mentioned interruption method in the learning mode, as the method proposed in U.S. Publication No. 2016/0349782 A1.

In addition, in the learning mode, the processor 111 may also obtain the full-load output voltages and their corresponding operating frequencies when the receiving-end module is located in different positions. Taking table 1 as an example, when the receiving-end module is closer to the supplying-end coil 116 (e.g., the self-resonant frequency is 100 kHz), the measured full-load output voltage is 100 V and the corresponding operating frequency is 110 kHz; and when the receiving-end module is farer from the supplying-end coil 116 (e.g., the self-resonant frequency is 150 kHz), the measured full-load output voltage is 150 V and the corresponding operating frequency is 160 kHz. In other words, when the coil distance is farer, the supplying-end coil 116 should provide a higher output voltage and output power, allowing the electric power to be transmitted to a farer receiving-end coil.

In general, in an induction type power supply system, the supplying-end module should configure a maximum value of the output power of the coil as an upper limit, to prevent the supplying-end coil from outputting excessive power to burn out the power receiving device when overloaded. That is, the processor of the supplying-end module may control the output power of the supplying-end coil to be under the upper limit. Alternatively, when the supplying-end module or the receiving-end module detects that the output power exceeds the upper limit, the induction type power supply system may enable a protection scheme or actively cut the power. Note that the receiving-end module may receive excessive energies more easily if the distance between the receiving-end module and the supplying-end coil is shorter. In order to prevent the receiving-end module from receiving excessive energies to be burnt out, the supplying-end module should configure the maximum output power according to the full-load output voltage corresponding to a receiving-end module in a nearer place, e.g., the maximum output voltage may be configured to 100 V. However, this output power configuration may not have enough power supply capability when the distance between the receiving-end module and the supplying-end coil is farer. In other words, when the receiving-end coil is farer from the supplying-end coil, the supplying-end coil should provide an output voltage 150 V to satisfy the power requirement in a full-load status. However, under the limit of the preconfigured maximum output power, the supplying-end coil may only provide at most 100 V. In order to solve the above problem, the present invention configures the maximum output power based on the full-load output voltage obtained in the learning mode. Based on various distances between the receiving-end coil and the supplying-end coil, the processor 111 may determine the distance according to the detected self-resonant frequency and configure an appropriate maximum output power accordingly.

Figure 4:
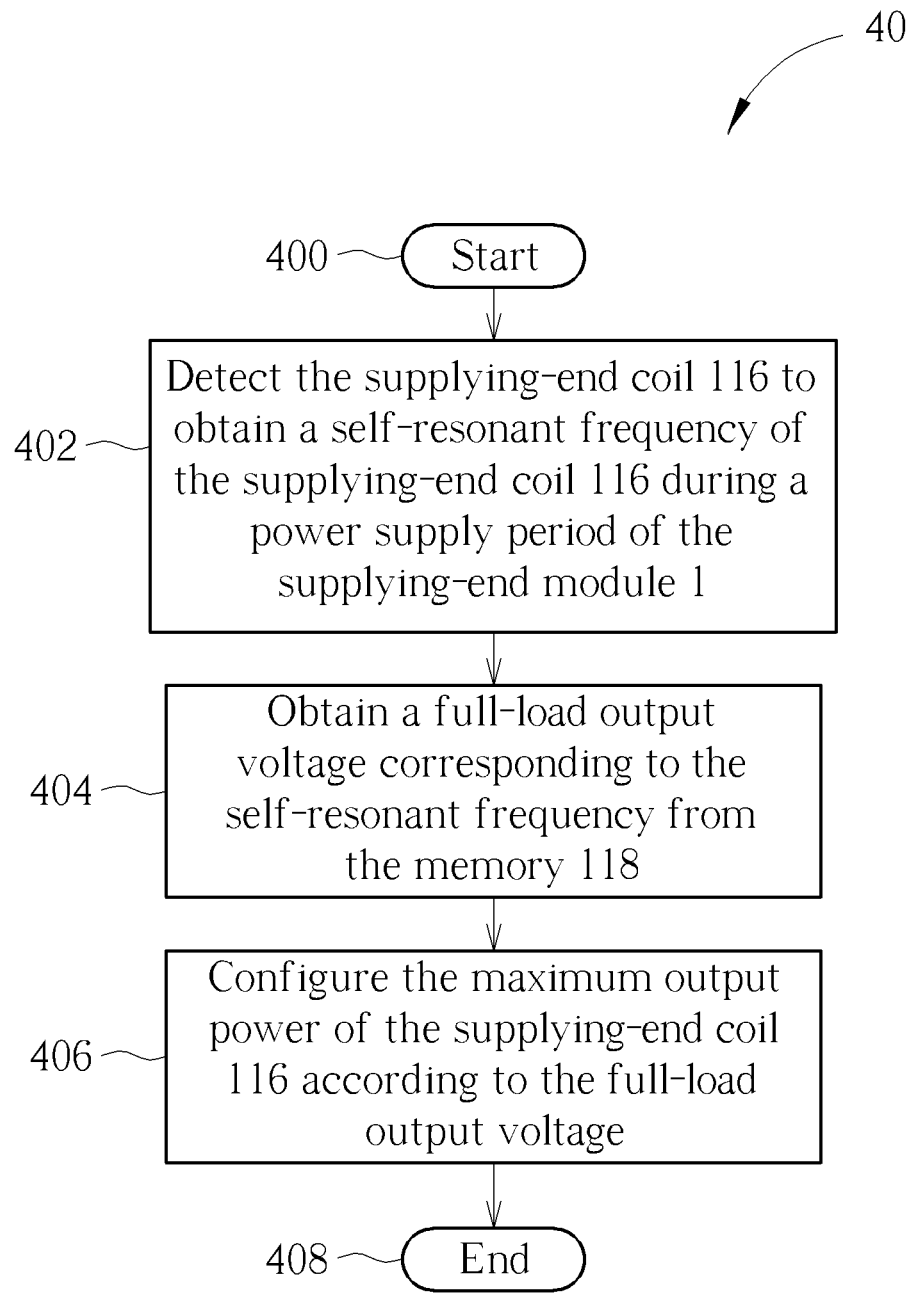
FIG. 4 is a flow chart of a configuration process according to an embodiment of the present invention.

Please refer to FIG. 4, which is a flowchart of a configuration process 40 of the maximum output power according to an embodiment of the present invention. The configuration process 40 may be implemented in the processor of the supplying-end module of the induction type power supply system, such as the processor 111 of the supplying-end module 1 shown in FIG. 1, for configuring the maximum output power of the supplying-end coil 116. As shown in FIG. 4, the configuration process 40 includes the following steps:

Step 400: Start.

Step 402: Detect the supplying-end coil 116 to obtain a self-resonant frequency of the supplying-end coil 116 during a power supply period of the supplying-end module 1.

Step 404: Obtain a full-load output voltage corresponding to the self-resonant frequency from the memory 118.

Step 406: Configure the maximum output power of the supplying-end coil 116 according to the full-load output voltage.

Step 408: End.

According to the configuration process 40, the supplying-end module 1 may control the driving signals D1 and D2 to be interrupted during the power supply period, allowing the supplying-end coil 116 to oscillate naturally, so as to detect the self-resonant frequency (Step 402). Subsequently, the processor 111 may retrieve the full-load output voltage obtained in the learning mode from the memory 118 according to the present self-resonant frequency of the coil (Step 404), and configure the maximum output power of the supplying-end coil 116 accordingly (Step 406). Taking Table 1 as an example for illustration, if the detected self-resonant frequency is 100 kHz, the maximum output voltage of the supplying-end coil 116 may be configured to 100 V; and if the detected self-resonant frequency is 150 kHz, the maximum output voltage of the supplying-end coil 116 may be configured to 150 V. In other words, the detected self-resonant frequency of the coil is higher means that the receiving-end module may be farer from the supplying-end coil; hence, the maximum output voltage or maximum output power may be configured to a higher value, so that the supplying-end module 1 may output larger power to drive the receiving-end module located in a farer position.

Please note that the present invention aims at determining whether the receiving-end module enters the power supply area of the supplying-end module and the distance between the receiving-end module and the supplying-end module by detecting the self-resonant frequency of the supplying-end coil, and selecting an appropriate output power for sending the activation signal and configuring an appropriate maximum output power accordingly. Those skilled in the art may make modifications and alternations accordingly. For example, in the above detection process 30, the processor 111 first determines whether the self-resonant frequency stops changing for a period of time. The processor 111 then controls the supplying-end coil 116 to send the activation signal after confirming that the self-resonant frequency does not change for a period of time. In another embodiment, in order to accelerate detection of the power receiving device, the processor 111 may drive the supplying-end coil 116 to send the activation signal immediately when detecting that the self-resonant frequency falls and determining that the receiving-end module enters the coil sensing area of the supplying-end module 1. Furthermore, in the embodiments of the present invention, determination of the distance between the power supply device and the power receiving device is one of the main technical features, where the power supply device may be considered as the supplying-end coil or the supplying-end module, and the power receiving device may be considered as the receiving-end coil or the receiving-end module. In other words, the determined distance in the present invention may be the distance between the supplying-end module and the receiving-end module, the distance between the supplying-end coil and the receiving-end coil, the distance between the supplying-end coil and the receiving-end module, or the distance between the supplying-end module and the receiving-end coil. These terms in the present disclosure are all applicable and interchangeable, and all of these distances may correspond to the self-resonant frequency of the supplying-end coil, as a basis of detecting the power receiving device and configuring the output power.

In addition, in the embodiments of the present invention, the output power of the coil (including the maximum output power) may be considered as the output voltage of the coil. Those skilled in the art should realize that the output voltage is positively correlated to the output power; that is, the larger the output voltage of the coil, the larger the output power of the coil. Therefore, the configuration of output voltage may be considered as the configuration of output power. In addition, in the learning mode, the corresponding operating frequencies with no load and full load are respectively obtained, as shown in Table 1. Please note that the output voltage of the coil may be affected by the load status during operations of the induction type power supply system. In comparison, the operating frequency is better able to reflect the magnitude of the output power. In such a condition, the no-load and full-load operating frequencies may be applied as the upper and lower limits for controlling the maximum value and the minimum value of the output power in the induction type power supply system. Take Table 1 as an example for illustration. If the detected self-resonant frequency is 140 kHz, the upper limit of the operating frequency may be configured to 170 kHz (i.e., the no-load operating frequency), and the lower limit of the operating frequency may be configured to 150 kHz (i.e., the full-load operating frequency). In other words, the processor 111 may control the operating frequency of the supplying-end coil 116 to be within a range between 150 kHz and 170 kHz, so as to control the output voltage of the supplying-end coil 116 to fall between 90 V and 140 V.

As a result, in the learning mode, the present invention obtains the no-load and full-load output voltages and/or corresponding operating frequencies when the receiving-end module is located in different positions, and stores the information in the memory. Therefore, the supplying-end module may detect the position of the receiving-end module and perform output power configuration according to the detected self-resonant frequency of the coil. In comparison with the prior art where the supplying-end module may not know the position of the receiving-end module, the supplying-end module of the present invention may detect the distance of the receiving-end module, so as to control the supplying-end coil to send the activation signal with an appropriate output power. During the power supply process, the processor may configure the upper limit of the output power according to the distance of the receiving-end module, so as to configure or select an appropriate output power to prevent the power receiving device from receiving excessive energies to be burnt out.

To sum up, the present invention may determine whether the receiving-end module enters the power supply area of the supplying-end module and the distance between the receiving-end module and the supplying-end module by detecting the self-resonant frequency of the supplying-end coil. In the learning mode, the supplying-end module may obtain the basic frequency and also obtain the no-load and full-load output voltages and/or corresponding operating frequencies with the self-resonant frequencies when the receiving-end module is in different positions. During the operations, the supplying-end module determines whether there is a receiving-end module existing in its coil sensing area according to whether the detected self-resonant frequency is smaller than the basic frequency. The power loss and EMI generated by this determination method are quite low. After detecting a receiving-end module, the supplying-end module may determine the distance between the receiving-end module and the supplying-end module according to the self-resonant frequency, so as to control the supplying-end coil to send the activation signal with an appropriate output power and configure an appropriate maximum output power. As a result, the present invention may effectively control the output power of the supplying-end coil, to prevent the power receiving device from being burnt out due to excessive output power when the receiving-end module is nearer, and also prevent that the receiving-end module may not be effectively detected when the receiving-end module is farer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of detecting a receiving-end module, for a supplying-end module of an induction type power supply system, the supplying-end module comprising a supplying-end coil, the method comprising:
   enabling a learning mode and obtaining a frequency of the supplying-end coil when there is no object put in a sensing area of the supplying-end coil in the learning mode, and storing the frequency as a basic frequency;
   detecting the supplying-end coil to obtain a self-resonant frequency of the supplying-end coil;
   comparing the self-resonant frequency with the basic frequency detected on the supplying-end coil to determine whether the self-resonant frequency is smaller than the basic frequency; and
   performing the following steps when the self-resonant frequency is determined to be smaller than the basic frequency and the degree of the self-resonant frequency smaller than the basic frequency exceeds a threshold:
      obtaining a first output power level corresponding to the self-resonant frequency; and
      sending an activation signal with the first output power level, and starting to supply electric power when a data code corresponding to the activation signal is received;
   wherein in the learning mode, when the receiving-end module is disposed in the sensing area of the supplying-end coil and the receiving-end module is configured to have no load, the method further comprises the following steps:
      supplying power to the receiving-end module, and measuring the self-resonant frequency of the supplying-end coil and measuring at least one of an operating frequency and a no-load output voltage of the supplying-end coil when the receiving-end module is respectively located in different positions in the sensing area; and mapping the self-resonant frequency to the operating frequency or the no-load output voltage obtained in each of the positions, and storing the mapping relations.

2. The method of claim 1, wherein the step of obtaining the first output power level corresponding to the self-resonant frequency comprises:

obtaining the no-load output voltage corresponding to the self-resonant frequency, and configuring the first output power level according to the no-load output voltage.

3. The method of claim 1, wherein in the learning mode, when the receiving-end module is disposed in the sensing area of the supplying-end coil and the receiving-end module is configured to have full load, the method further comprises the following steps:

supplying power to the receiving-end module, and measuring the self-resonant frequency of the supplying-end coil and measuring at least one of an operating frequency and a full-load output voltage of the supplying-end coil when the receiving-end module is respectively located in different positions in the sensing area; and mapping the self-resonant frequency to the operating frequency or the full-load output voltage obtained in each of the positions, and storing the mapping relations.

4. The method of claim 3, further comprising:

obtaining the full-load output voltage corresponding to the self-resonant frequency measured during operations of the supplying-end coil, and configuring a maximum output power of the supplying-end coil accordingly.

5. The method of claim 1, wherein when the supplying-end module does not receive the data code corresponding to the activation signal, the method further comprises the following steps:

resending the activation signal;

stopping sending the activation signal and detecting the self-resonant frequency of the supplying-end coil when the number of times the activation signal is sent reaches a specific number and the data code is not received; and restarting to perform the steps in claim 1 when detecting that the self-resonant frequency of the supplying-end coil changes.

6. The method of claim 1, wherein the supplying-end coil supplies electric power with the first output power level when the data code corresponding to the activation signal is received.

7. The method of claim 1, wherein the step of obtaining the first output power level corresponding to the self-resonant frequency is performed after the self-resonant frequency stops changing for a period of time.

8. The method of claim 1, further comprising:

stopping supplying electric power when the self-resonant frequency is determined to be close to or greater than the basic frequency.

9. A supplying-end module for an induction type power supply system, for detecting a receiving-end module of the induction type power supply system, the supplying-end module comprising:

a supplying-end coil; and
a processor, configured to perform the following steps:
enabling a learning mode and obtaining a frequency of the supplying-end coil when there is no object put in a sensing area of the supplying-end coil in the learning mode, and storing the frequency in the memory as a basic frequency;

detecting the supplying-end coil to obtain a self-resonant frequency of the supplying-end coil;

comparing the self-resonant frequency with the basic frequency detected on the supplying-end coil to determine whether the self-resonant frequency is smaller than the basic frequency; and performing the following steps when the self-resonant frequency is determined to be smaller than the basic frequency and the degree of the self-resonant frequency smaller than the basic frequency exceeds a threshold:

obtaining a first output power level corresponding to the self-resonant frequency; and controlling the supplying-end coil to send an activation signal with the first output power level, and controlling the supplying-end coil to start to supply electric power when a data code corresponding to the activation signal is received;

wherein in the learning mode, when the receiving-end module is disposed in the sensing area of the supplying-end coil and the receiving-end module is configured to have no load, the processor further performs the following steps:

supplying power to the receiving-end module, and measuring the self-resonant frequency of the supplying-end coil and measuring at least one of an operating frequency and a no-load output voltage of the supplying-end coil when the receiving-end module is respectively located in different positions in the sensing area; and mapping the self-resonant frequency to the operating frequency or the no-load output voltage obtained in each of the positions, and storing the mapping relations in the memory.

10. The supplying-end module of claim 9, wherein the step of obtaining the first output power level corresponding to the self-resonant frequency comprises:

obtaining the no-load output voltage corresponding to the self-resonant frequency, and configuring the first output power level according to the no-load output voltage.

11. The supplying-end module of claim 9, wherein in the learning mode, when the receiving-end module is disposed in the sensing area of the supplying-end coil and the receiving-end module is configured to have full load, the processor further performs the following steps:

supplying power to the receiving-end module, and measuring the self-resonant frequency of the supplying-end coil and measuring at least one of an operating frequency and a full-load output voltage of the supplying-end coil when the receiving-end module is respectively located in different positions in the sensing area; and mapping the self-resonant frequency to the operating frequency or the full-load output voltage obtained in each of the positions, and storing the mapping relations in the memory.

12. The supplying-end module of claim 11, wherein the processor further performs the following step:

obtaining the full-load output voltage corresponding to the self-resonant frequency measured during operations of the supplying-end coil, and configuring a maximum output power of the supplying-end coil accordingly.

13. The supplying-end module of claim 9, wherein when the supplying-end module does not receive the data code corresponding to the activation signal, the processor further performs the following steps:

resending the activation signal;

stopping sending the activation signal and detecting the self-resonant frequency of the supplying-end coil when the number of times the activation signal is sent reaches a specific number and the data code is not received; and restarting to perform the steps in claim 9 when detecting that the self-resonant frequency of the supplying-end coil changes.

14. The supplying-end module of claim 9, wherein the supplying-end coil supplies electric power with the first output power level when the data code corresponding to the activation signal is received.

15. The supplying-end module of claim 9, wherein the step of obtaining the first output power level corresponding to the self-resonant frequency is performed after the self-resonant frequency stops changing for a period of time.

16. The supplying-end module of claim 9, wherein the processor further performs the following step:

controlling the supplying-end coil to stop supplying electric power when the self-resonant frequency is determined to be close to or greater than the basic frequency.

17. A method of detecting a receiving-end module, for a supplying-end module of an induction type power supply system, the supplying-end module comprising a supplying-end coil, the method comprising:

enabling a learning mode and obtaining a frequency of the supplying-end coil when there is no object put in a sensing area of the supplying-end coil in the learning mode, and storing the frequency as a basic frequency;

detecting the supplying-end coil to obtain the self-resonant frequency of the supplying-end coil;

comparing the self-resonant frequency with the basic frequency detected on the supplying-end coil to determine whether the self-resonant frequency is smaller than the basic frequency; and performing the following steps when the self-resonant frequency is determined to be smaller than the basic frequency and the degree of the self-resonant frequency smaller than the basic frequency exceeds a threshold:

obtaining a first output power level corresponding to the self-resonant frequency; and sending an activation signal with the first output power level, and starting to supply electric power when a data code corresponding to the activation signal is received;

wherein in the learning mode, when the receiving-end module is disposed in the sensing area of the supplying-end coil and the receiving-end module is configured to have full load, the method further comprises the following steps:

supplying power to the receiving-end module, and measuring the self-resonant frequency of the supplying-end coil and measuring at least one of an operating frequency and a full-load output voltage of the supplying-end coil when the receiving-end module is respectively located in different positions in the sensing area; and mapping the self-resonant frequency to the operating frequency or the full-load output voltage obtained in each of the positions, and storing the mapping relations.

18. A supplying-end module for an induction type power supply system, for detecting a receiving-end module of the induction type power supply system, the supplying-end module comprising:

a supplying-end coil; and a processor, configured to perform the following steps:

enabling a learning mode and obtaining a frequency of the supplying-end coil when there is no object put in a sensing area of the supplying-end coil in the learning mode, and storing the frequency in the memory as a basic frequency detecting the supplying-end coil to obtain a self-resonant frequency of the supplying-end coil;

comparing the self-resonant frequency with the basic frequency detected on the supplying-end coil to determine whether the self-resonant frequency is smaller than the basic frequency; and performing the following steps when the self-resonant frequency is determined to be smaller than the basic frequency and the degree of the self-resonant frequency smaller than the basic frequency exceeds a threshold:

obtaining a first output power level corresponding to the self-resonant frequency; and controlling the supplying-end coil to send an activation signal with the first output power level, and controlling the supplying-end coil to start to supply electric power when a data code corresponding to the activation signal is received;

wherein in the learning mode, when the receiving-end module is disposed in the sensing area of the supplying-end coil and the receiving-end module is configured to have full load, the processor further performs the following steps:

supplying power to the receiving-end module, and measuring the self-resonant frequency of the supplying-end coil and measuring at least one of an operating frequency and a full-load output voltage of the supplying-end coil when the receiving-end module is respectively located in different positions in the sensing area; and mapping the self-resonant frequency to the operating frequency or the full-load output voltage obtained in each of the positions, and storing the mapping relations in the memory.

* * * * *